March 24, 1959 — W. C. HEMPHILL — 2,879,378
WARNING BARRICADE CONSTRUCTION
Filed Sept. 26, 1956 — 2 Sheets-Sheet 1
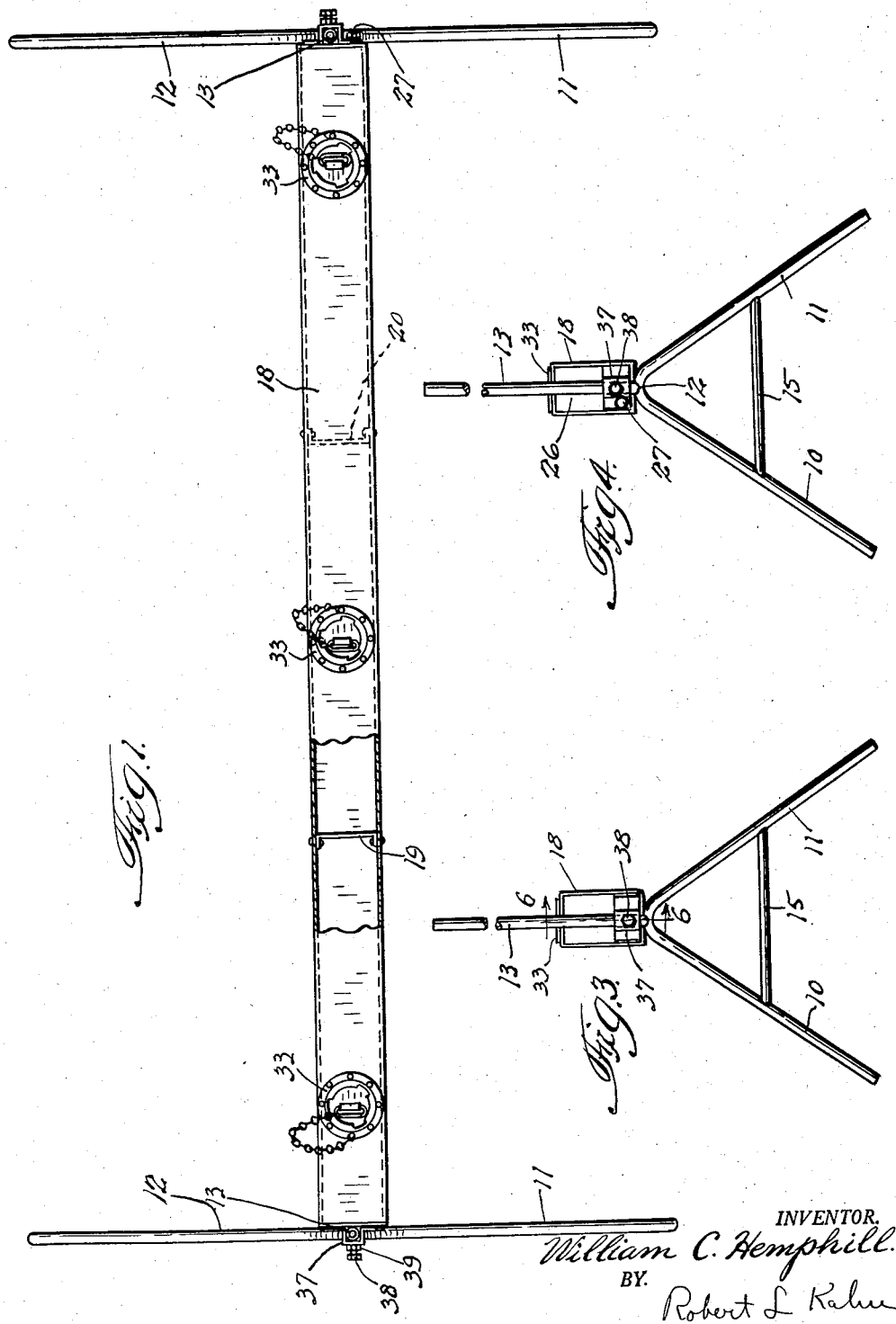
INVENTOR.
William C. Hemphill.
BY Robert L. Kahn March 24, 1959 — W. C. HEMPHILL — 2,879,378
WARNING BARRICADE CONSTRUCTION
Filed Sept. 26, 1956 — 2 Sheets-Sheet 2
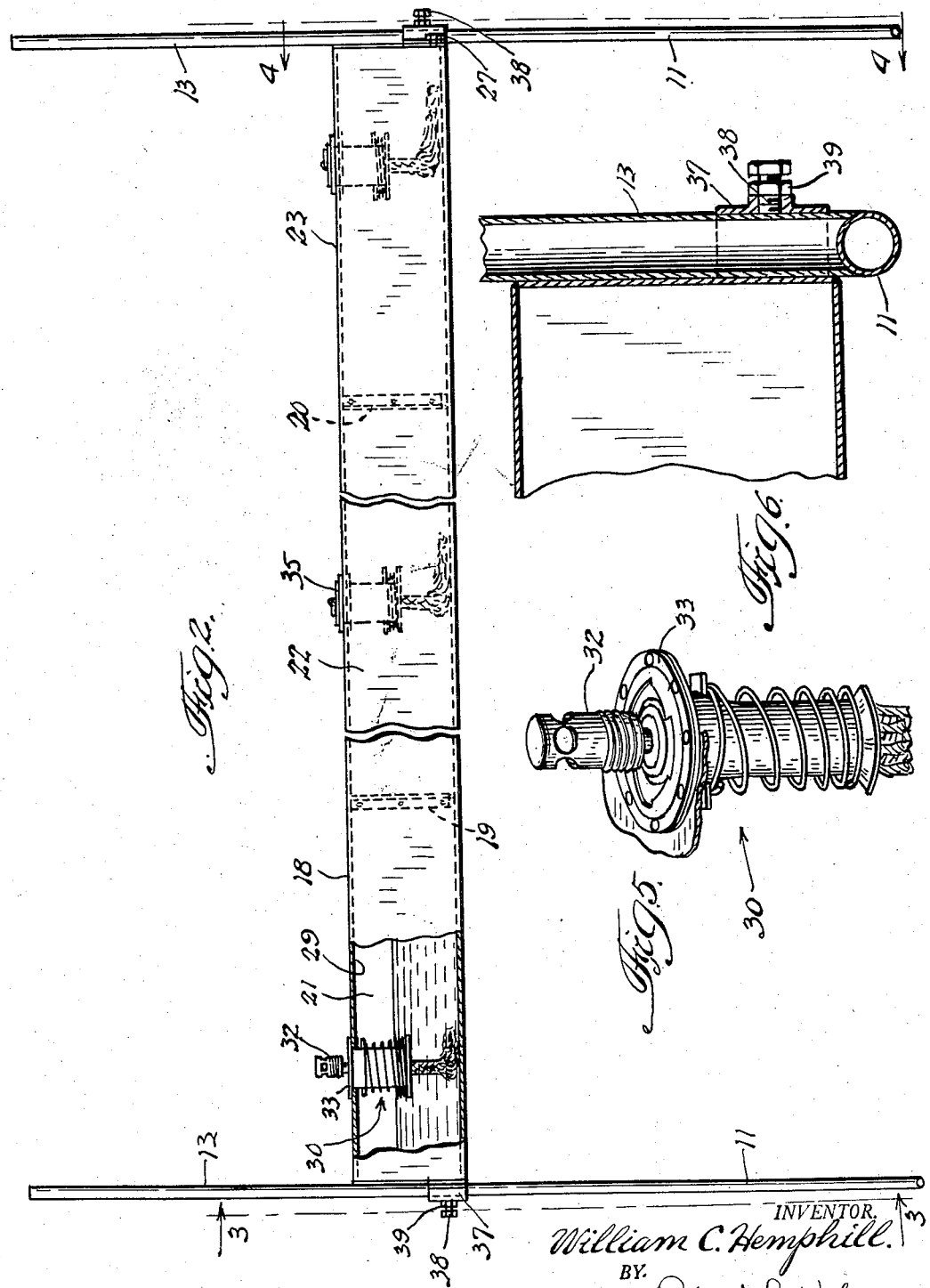

United States Patent Office 2,879,378
Patented Mar. 24, 1959

2,879,378

WARNING BARRICADE CONSTRUCTION

William C. Hemphill, Chicago, Ill., assignor to Traffic Safety Equipment Co., a corporation of Illinois Application September 26, 1956, Serial No. 612,227

1 Claim. (Cl. 240—2)

This invention relates to a warning barricade and particularly to a unitary construction of a barricade and warning light or lights.

In construction work, particularly on highways and streets, it is frequently necessary to have a barricade and provide illumination as a warning to traffic. It has been customary to provide barricades and to hang lanterns therefrom or dispose flare pots near the barricades. These lanterns or flare pots include a small fuel tank upon which the lantern is mounted and into which the wick extends. In many instances, through carelessness and neglect, the lantern or flare pot has been omitted, misplaced, has not been lighted or has not been refilled. Even when properly disposed on a barricade and lighted, lanterns and flare pots have a limited time of operation with one filling. As a rule, the lanterns and flare pots use kerosene or fuel oil and when the supply is exhausted it is necessary for a watchman or caretaker to refill the tank. In many instances, the supply of fuel is used up faster than anticipated or, through carelessness or neglect, no refill of the tank in the lantern or flare pot is made. As a result, costly and fatal accidents have occurred.

In addition to the above, electric warning signals are also used. However these are unreliable due to battery failure and failure of flasher mechanism.

In accordance with this invention, a construction is provided wherein a barricade and liquid fuel consuming lamp are combined into a unitary device, the construction providing a fuel tank sufficiently great so that frequent refillings are unnecessary. In many instances, refills are not necessary and the fuel supply will be sufficient for the time that the barricade is in position.

It will accordingly be clear that a construction embodying the invention will not only be economical in requiring less attention but may also prevent accidents.

It is preferred to use a flare pot rather than a lantern. When so used, the invention provides a construction which elevates a flare pot above the usual ground location and thus enhances the warning effect. Furthermore, the invention makes it possible to dispense with the usual step of removing the wick from a flare pot to fill the fuel tank. In the new construction, a refill hole is provided for the fuel tank.

The invention in general provides a barricade construction wherein the barricade proper includes as an integral part one or more fuel tanks or supports within which one or more fuel tanks may be disposed. The fuel tank or tanks or supports therefor form part of the barricade structure both from the point of view of appearance and function. The tank or tanks are adapted to accommodate one or more lantern burner units. Where the tank or tanks are of rigid material such as metal, the tank walls are part of the barricade structure. Where one or more tanks have walls which cannot function as barricade structural elements, because the wall is too thin or because the tank is made of some flexible plastic material, then the barricade may function as a shroud for enclosing and supporting the tank or tanks. In all cases, the tank or tanks are adapted to support lantern burner units, such units being complete except for a fuel tank. Each burner unit will then have a tank cooperating therewith to provide one or more complete lanterns.

Referring now to the drawings, an exemplary embodiment of the invention is disclosed. It is understood however, that variations may be made without departing from the scope of the invention except as defined by the appended claim.

Figure 1 is a plan view of a barricade embodying the present invention.

Figure 2 is an elevation of the barricade of Figure 1, certain parts being broken away.

Figures 3 and 4 are end elevations from lines 3—3 and 4—4 respectively, on Figure 2.

Figure 5 is a perspective view illustrating a telescopic burner unit which may be used in the new barricade.

Figure 6 is a sectional detail on line 6—6 of Figure 3 illustrating the tank construction.

The barricade illustrated herein has sloping legs 10 and 11 at each end of the barricade. Legs 10 and 11 extend upwardly toward each other and support bight 12 at the top of the legs. Extending straight up from bight 12 is post 13. Legs 10 and 11 have cross piece 15.

Supported between posts 13 is an elongated fuel tank generally indicated by 18. This tank forms the body of the barricade. This fuel tank may be made as long as desired and may have therein partitions 19 and 20 dividing the fuel tank into a number of compartments 21, 22 and 23. It is not essential that the interior of the fuel tank be compartmentized and, when thus divided, it is understood that as many compartments may be provided as deemed desirable. The compartments may be completely isolated from each other or may be interconnected by clearances between the partitions and the bottom or other suitable wall of tank 18. Interconnected compartments are generally preferable for the reason that they may be filled and emptied through one opening and will insure that fuel is equally distributed. The tank structure may have supporting beams along the length for rigidity or the tank may be of heavy gauge steel for strength.

As illustrated here, one end wall such as end wall 26 is provided with drain plug 27 near the bottom of the tank. The fuel tank has top wall 29 apertured to accommodate lantern burner units 30. These apertures may be provided with collars having threading or other means for firmly retaining a lantern burner unit. It is preferred to have at least one lantern unit opening per tank compartment. Each lantern burner unit includes a burner 32 having a wick extending downwardly. The burner is slidable in support 33 and is biased upwardly by spring 34. A snuffer cap 35 is provided and is adapted to lock the burner in a down position when not used. For a more complete description of such a burner unit, reference is made to United States Patents 2,164,613 and 2,250,710. Other burner units may be used. Telescopic or retractable units are preferred.

Fuel tank 18 is slidingly supported on posts 13 so that the entire barricade may be dismantled if desired. The end walls of tank 18 are provided with brackets 37 having bolts 38 threaded into the brackets to engage posts 13 and lock nuts 39 are provided. Thus the tank may be levelled. If desired, the tank may be used alone and be placed on the ground or other support.

It is also possible to provide a heavy skeleton construction into which a fragile fuel tank of suitable plastic or other material may be disposed. Such tank will have suitable openings with collars for accommodating one or more lantern burner units.

The barricade may carry a suitable legend or caption such as Caution or Danger. These may be on the tank or signs may be hung from the tank. A barricade embodying the present invention may easily carry enough fuel so that a number of burners may operate continuously for a period of a week or more.

What is claimed is:

In combination, a combined barricade and flare construction comprising a metal tank adapted to be disposed in generally horizontal position when in use, said metal tank having at least one dividing partition in the interior extending transversely of the tank, said partitions being of metal and permitting liquid flow through the same and adapted to stiffen the tank while suppressing sloshing of the tank contents, clamping means carried by the tank ends, legs having a straight vertical portion at each tank end for cooperation with said clamping means and telescopic flares mounted in the top wall of said tank, said flares having wicks extending into the tank for fuel stored in the tank, said tank having a generally uniform depth throughout the tank length and the depth being sufficiently great to permit a flare unit to be telescoped into said tank, said barricade being adapted to be dismantled with the flares telescoped into the tank and protected for transportation.

References Cited in the file of this patent

UNITED STATES PATENTS

| | | |
|---|---|---|
| 2,164,613 | Larson | July 4, 1939 |
| 2,250,710 | Hutt | July 29, 1941 |
| 2,583,244 | Underwood | Jan. 22, 1953 |

UNITED STATES PATENT OFFICE

CERTIFICATE OF CORRECTION

Patent No. 2,879,378 March 24, 1959

William C. Hemphill

It is hereby certified that error appears in the above numbered patent requiring correction and that the said Letters Patent should read as corrected below.

In the grant lines 2 and 3, for "assignor to Traffic Safety Equipment Co., a corporation of Illinois," read -- assignor, by mesne assignments, to Anthes Force Oiler Company, of Fort Madison, Iowa, a corporation of Iowa, --; line 12, for "Traffic Safety Equipment Co., its successors" read -- Anthes Force Oiler Company, its successors --; in the heading to the printed specification, lines 3 and 4, for "assignor to Traffic Safety Equipment Co., a corporation of Illinois" read -- assignor, by mesne assignments, to Anthes Force Oiler Company, Fort Madison, Iowa, a corporation of Iowa --.

Signed and sealed this 1st day of September 1959.

(SEAL)
Attest:

KARL H. AXLINE
Attesting Officer

ROBERT C. WATSON
Commissioner of Patents